May 24, 1932.  R. BERNADY  1,859,493
ELECTROMAGNETICALLY CONTROLLED REVERSING GEAR
Filed Jan. 3, 1929    3 Sheets-Sheet 1
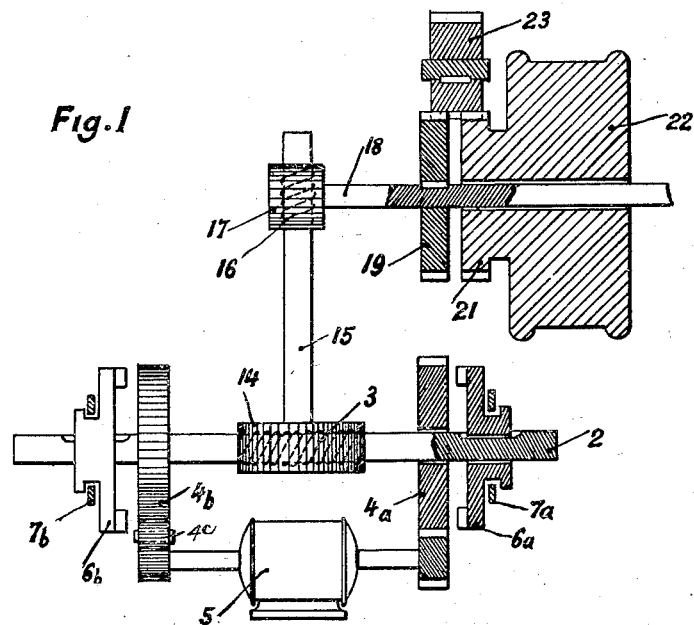
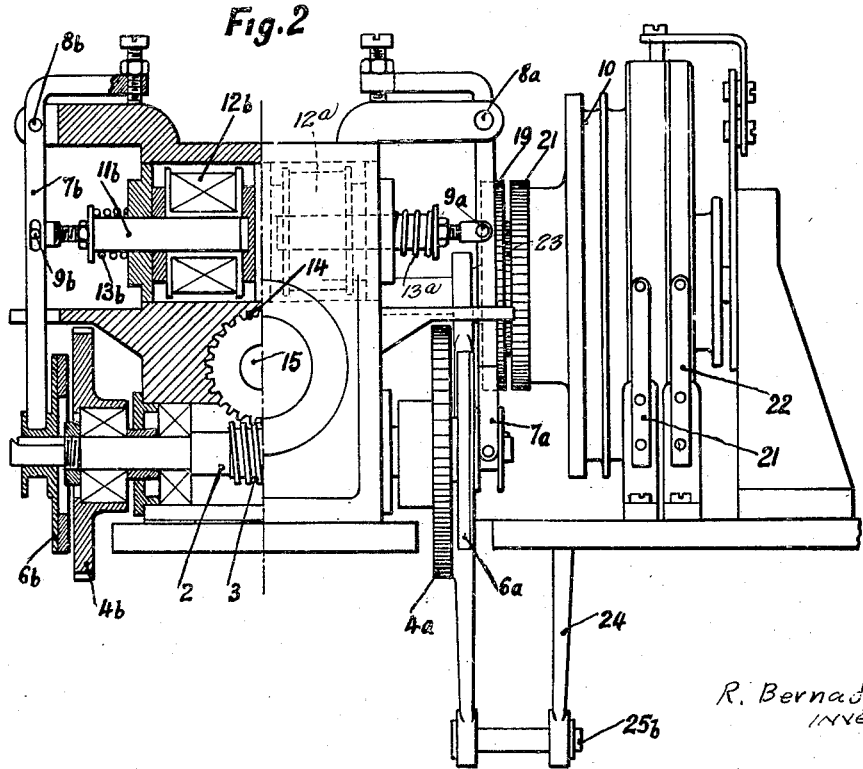

May 24, 1932. R. BERNADY 1,859,493
ELECTROMAGNETICALLY CONTROLLED REVERSING GEAR
Filed Jan. 3, 1929 3 Sheets-Sheet 2

R. Bernady
INVENTOR

By: Marks & Clerk
Attys.

May 24, 1932.  R. BERNADY  1,859,493
ELECTROMAGNETICALLY CONTROLLED REVERSING GEAR
Filed Jan. 3, 1929  3 Sheets-Sheet 3

R. Bernady
INVENTOR

Patented May 24, 1932

1,859,493

UNITED STATES PATENT OFFICE

RAOUL BERNADY, OF NEUILLY, FRANCE, ASSIGNOR TO SOCIETE D'ETUDES ET DE CONSTRUCTION D'APPAREILS DE TELEMECANIQUE, OF NEUILLY, FRANCE, A CORPORATION OF FRANCE

ELECTROMAGNETICALLY CONTROLLED REVERSING GEAR

Application filed January 3, 1929, Serial No. 330,016, and in France January 14, 1928.

My invention has for its object a transmission adapted to be thrown into gear electromagnetically and to provide the transmission of orders, through the continuous or intermittent rotation in the desired direction of a suitable part such as a pulley operatively connected with the parts to be controlled.

My improved transmission comprises chiefly two toothed wheels rotating in opposite direction at the same speed and two friction wheels adapted to control the pulley or like part, an electromagnetic device such as an electromagnet with a plunger core being adapted to bring each friction wheel against the corresponding toothed wheel so as to be rotated therewith.

Such electromagnetic clutches show the advantage of allowing instantaneous disconnections; on the other hand, such clutches allow several transmissions to be controlled by a single motor, which is not the case with the usual relays adapted to change the direction of rotation.

Another object of my invention is to provide a reducing gear comprising preferably several worms disposed between the above described clutches and the pulley or like part so as to reduce the inertia drive, after the electromagnetic current is broken, to zero. I obtain thus a great accuracy in the angles of rotation and I need not use the braking systems which are required when a single worm is used.

I also provide a contacting device and a stop allowing on one hand very accurate rotations by predetermined angles for every current impulse passing through the electromagnets and keeping on the other hand the angle of rotation of the transmission pulley underneath a limit value.

Other features of my invention will appear from the following description of a transmission given by way of example and illustrated on accompanying drawings on which:

Fig. 1 is a diagram of the whole arrangement serving as an auxiliary motor.

Fig. 2 is partly a front view of the same and partly a cross section along line $ab$ of Fig. 3.

Figure 3:
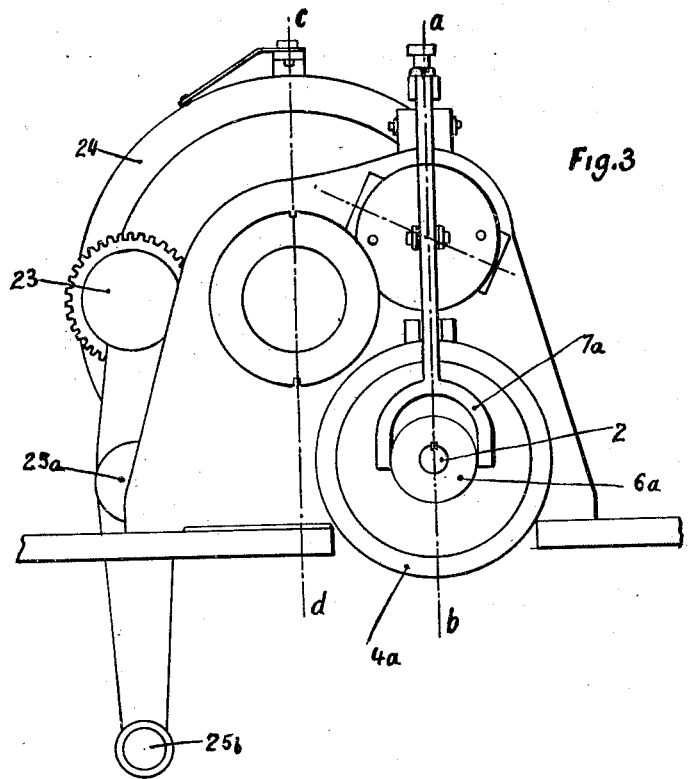
Fig. 3 is a side view.

In the body of the device is located the shaft 2 with its worm 3. On either side of said worm are two toothed wheels $4a$, $4b$ mounted loosely on said shaft and driven continuously by the electric motor 5 (omitted from Figs. 2 to 4). An intermediary pinion $4c$ is used for reversing the relative motion of $4b$ with reference to $4a$. The two ends of the shaft 2 are provided with two friction wheels $6a$, $6b$ adapted to move longitudinally along shaft 2 without rotating with reference thereto. Forks $7a$, $7b$ control the friction wheels and move them towards or away from the corresponding toothed wheels. These forks are pivotally secured to spindles $8a$, $8b$ (Fig. 2) and are connected at $9a$, $9b$ with the plunging cores $11a$, $11b$ of the electromagnets $12a$, $12b$. Springs $13a$, $13b$ return the cores outwards, whereas the excitation of the electromagnets draws them inwards.

Figure 4:
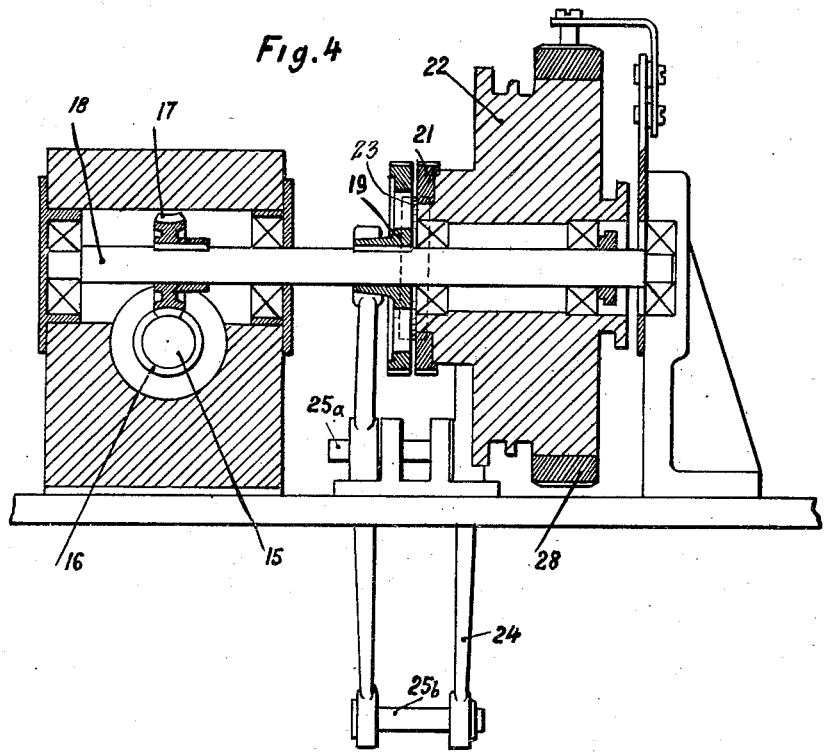
Fig. 4 is a cross section along line $cd$ of Fig. 3.

The worm 3 meshes with a pinion 14 keyed to the intermediary shaft 15 which through a worm 16 controls a pinion 17 keyed to the transmission shaft 18 (Figs. 1 and 4). To the transmission shaft is keyed a toothed wheel 19 disposed in front of a toothed wheel 21 having the same diameter and the same tooth-work and secured to or integral with the transmission pulley 22 over which passes a belt actuating the devices to be controlled by the auxiliary motor described. A comparatively wide pinion 23 is mounted on a pivoting part 24 (Figs. 2 to 4) adapted to swing on the spindle $25a$ under the action of the spindle $25b$ when it is desired to make the pinion 23 mesh simultaneously with the two toothed wheels 19 and 21.

The device works as follows.

I will suppose the electromagnet $12b$ is excited and attracts its core $11b$. This will due to the connection between the core and the fork 7b apply the friction wheel 6b against the wheel 4b whereby the said friction wheel will rotate together with the wheel 4b. The shaft 2 will rotate and drive the pinion 14, the intermediary shaft 15, the pinion 17 and the transmission shaft 18. If care has been taken to move the pivoting part 24 so as to bring the pinion 23 into mesh with the wheels 19, 21, these latter will rotate together and drive the pulley 22. Obviously if the electromagnet 12a has been excited, the pulley would have rotated in the reverse direction.

Figure 5:
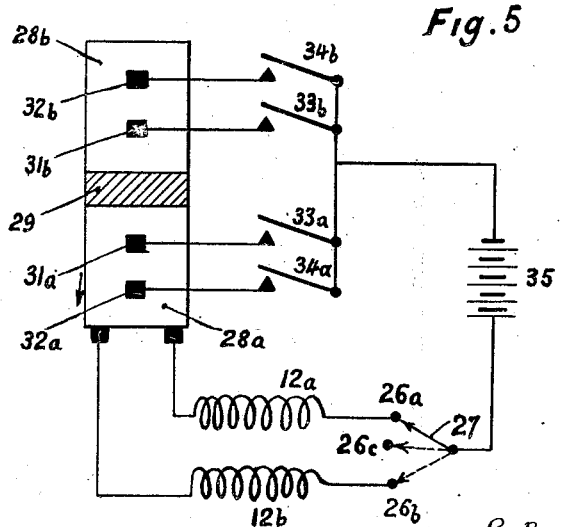
Fig. 5 is a diagram of the contacting device.

Current is sent into the electromagnets 12a, 12b through a three-contact switch (Fig. 5). Of these three contacts 26a, 26b, 26c the middle contact 26c is neutral. Obviously according as to whether the switch arm 27 is on one or the other of these contacts, the pulley will be rotated in one or the other direction or else is stationary.

To make the pulley rotate by predetermined angles, I may use the contact device diagrammatically shown on Fig. 5. To the pulley 22 or to a cylinder rotating therewith are applied two contact plates 28a, 28b separated by insulation at 29. Over these plates are adapted to rub sets of brushes 31a—31b, 32a, 32b ... which when the transmission is inoperative are symmetrically disposed with reference to the insulation 29. Each brush receives current through a switch 33a, 34a, 33b, 34b ... from a common supply of current 35.

The working is as follows. I will suppose for instance that the arm 27 feeds the electromagnet 12a which makes the pulley rotate in the direction of the arrow and that the switch 34a is closed. The current passes thus from 35 through the arm 27, the electromagnet 12a, the contact 28a, the brush 32a and the switch 34a. The pulley will rotate in the direction of the arrow but when it has rotated by an angle equal to that separating the insulation 29 from the brush 32a, the said insulation will come under the latter whereby the current is broken and consequently the pulley ceases rotating after having passed through a predetermined angle.

I may also in this case do away with the three-contact switch, the windings 12a and 12b being connected together and with the supply 35. According as to which switch 33a, 33b, 34a, 34b is closed, the pulley will rotate until the corresponding brush comes over the insulation 29.

Figure 6:
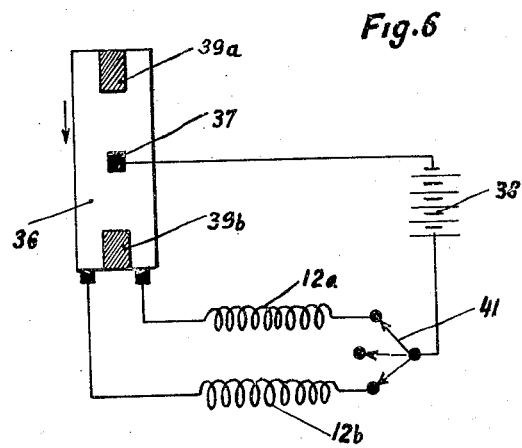
Fig. 6 is a diagram of the stop.

With such an arrangement I may also use a stop such as the one shown on Fig. 6 alone or in combination with the above contacting device. This stop prevents the transmission pulley from rotating by an angle above a predetermined value.

This stop is constituted by a conducting plate 36 secured to the periphery of the pulley or of a cylinder rotating therewith. A brush 37 adapted to rub on this plate is electrically connected with the supply 38. On either side of the brush 37 and symmetrically with reference thereto for the inoperative position of the arrangement, are two insulating parts 39a, 39b adapted to come under the brush 37 when the pulley rotates.

The arm 27 still feeding the electromagnet 12a, the circuit will be closed through the plate 36 and the brush 37 and will cause the pulley to rotate in the direction of the arrow. But when the pulley has rotated by an angle corresponding to the angular distance between 37 and 39a, the insulating part 39a coming under the brush 37 will break the circuit and the pulley will stop.

What I claim is:

1. A transmission chiefly for controlling aeroplane rudders comprising a driving shaft, two toothed wheels means whereby the driving shaft drives said wheels at the same speed, a driven shaft on which said wheels are loosely mounted, two friction wheels splined to said driven shaft, on either side of the toothed wheels, means for controlling the longitudinal motion of the friction wheels on their shafts, a worm on the driven shaft, a worm wheel meshing with said worm, a second worm gear controlled by said worm wheel, a pinion controlled by said worm gear, a power transmitting part, a gear wheel secured to said part and the size and toothwork of which are identical with the size and toothwork of the pinion, a pivotally mounted second pinion adapted to simultaneous mesh with the first pinion and with the last mentioned gear wheel.

2. A device of the class described comprising a driving shaft, a pair of toothed wheels loosely journaled thereon, a pair of friction wheels slidably keyed on said shaft, means for driving the toothed wheels, means for selectively sliding the friction wheels for engagement with the toothed wheels to cause the same to rotate with the shaft, a driven shaft, a gear fixed to said shaft, a power transmitting element on the latter shaft and having a gear thereon, a pinion, means for swinging the pinion into or out of mesh with both gears, and a driving connection between said shafts.

RAOUL BERNADY.